United States Patent Office 2,937,213
Patented May 17, 1960

2,937,213

PYROLYTIC CRACKING PROCESS AND HEAT EXCHANGE PEBBLE

Le Roi E. Hutchings, Crystal Lake, and Nathaniel L. Remes, Elgin, Ill., assignors to The Pure Oil Company, Chicago, Ill., a corporation of Ohio No Drawing. Application December 19, 1956
Serial No. 629,220

9 Claims. (Cl. 260—683)

This invention relates to the economical production of unsaturated hydrocarbons of low molecular weight, such as propylene, ethylene, acetylene and acetylene derivatives, by the high temperature pyrolysis of hydrocarbon feed stocks by means of a continuous, economical process employing a high temperature reaction zone followed by rapid cooling or quenching of the reaction effluent.

The strictly pyrolytic cracking of selected or prepared hydrocarbon feed stocks to produce unsaturated hydrocarbons can be effected in a number of thermal processes, all of which are subject to difficulties resulting from the relatively slow cooling of the products of reaction. Regenerative refractory systems wherein the requirements of high reaction temperature, short contact time, rapid quenching of the reaction effluent, and low pressure drop are produced by passing a gaseous or vaporous feed stock over a mass of a hot refractory provide an expeditious method for hydrocarbon pyrolysis. Systems of this nature are less sensitive to carbon formation and generally permit shorter residence times and correspondingly higher conversion temperatures than can be employed in tubular reactors wherein the feed stock passes through a cracking coil maintained at a desirable conversion temperature.

In pyrolytic systems the unsaturated aliphatic hydrocarbons and other conversion products are produced from atomic and free radical species resulting from the primary dissociation of the feed stock. With this type of reaction mechanism, when the products of pyrolysis containing the unsaturated aliphatic hydrocarbons are cooled at a slow rate, numerous undesirable secondary reactions occur with the consequent formation of higher molecular weight products, including tars and coke. These reactions not only reduce the yields of desired products but also lead to operating difficulties resulting from the deposition of coke and tars in the process equipment. These yield-reducing side reactions are favored by the higher temperatures which exist in regenerative refractory systems. Since the amount of heat stored in the refractory mass is dependent upon the initial temperature of the heat-transfer medium, higher initial temperatures are desirable. This expedient, however, cannot be employed in practice because the temperatures of the refractory mass must be maintained relatively low to avoid the undesirable side reactions. Accordingly, the efficiency of the operation is sacrificed because the lower operating temperatures reduce conversion-per-pass and require more frequent reheating of the refractory mass.

It is, therefore, an object of this invention to suppress free radical formation and polymerization of the reaction effluent by specially treating the refractory mass employed in regenerative, refractory, pyrolytic systems wherein selected hydrocarbon feed stocks are processed. It is another object of this invention to provide a regenerative, refractory, pyrolytic process which permits the use of higher temperatures in the treatment of selected hydrocarbon feed stocks in regenerative furnaces without producing undesirable side reactions which deleteriously affect the yield of lower molecular weight hydrocarbons. It is a further object of this invention to provide for the efficient production of ethylene and propylene in a regenerative, refractory, pyrolytic system. These and other objects will be made more apparent by the following detailed description of this invention.

According to this invention, it has been found that undesirable side reactions such as free radical formation and polymerization in the reaction effluent emanating from the reaction zone of a regenerative, refractory, pyrolytic system can be reduced by including in the refractory, heat-transfer mass boron oxide or other free radical suppressors. Although it is preferable that the entire refractory mass comprising the reaction zone and quenching zone be treated, treatment of only those sections which form the reaction zone or the quenching zone is also effective. While the instant invention has application in the operation of both fixed- and moving-bed regenerative, refractory, pyrolytic systems, the following discussion will be simplified by reference to its use in fixed-bed systems employing a mass of granular particles of heat-absorbing medium disposed within a single reaction vessel. In systems of this nature, the desired gas conversion can be carried out by heating the refractory mass to an elevated conversion temperature to provide a reaction zone. An adjacent section in the system remains cool to function as a quenching zone through which the reaction effluent from the reaction zone passes. A relatively cool, selected feed stock is contacted with the heated refractory mass whereby the accumulated heat is absorbed by the reactant to effect the desired conversion. The process is continued until the temperature level of the refractory mass is reduced below a desirable conversion temperature. Because of the high temperature of the effluent issuing from the reaction vessel, operating problems arise which require the use of specially designed valves for high temperature service, elaborate heat recovery systems, and the like. It is, therefore, desirable to operate this type of fixed-bed reactor in such a manner as to terminate the reaction cycle before the hot reaction zone, which slowly moves up through the reaction vessel, reaches the top of the reactor. In other words, it is preferred that a quenching zone be retained in the refractory mass in order that the reaction effluent will be cooled to a sufficiently low temperature to permit the use of conventional flow-control means in handling the reaction effluent. The relatively cool reactant feed entering the reaction vessel produces a cool zone adjacent to the feed inlet. Thereafter, when the direction of flow through the reactor is reversed, this latter cool zone functions as the quenching zone. This direct-reverse processing is carried out until the temperature of the hot zone has been reduced to below a satisfactory conversion level. This technique is described and claimed in copending U.S. patent application, entitled "Process," filed by Harvey Hennig, December 19, 1956, Serial No. 629,388, now U.S. Patent 2,885,455, issued May 5, 1959. This type of operation provides during each processing phase a cold zone at the end of the reactor of sufficient extent to effectively quench the products of reaction below reaction temperature, thereby permitting them to be handled in conventional flow-control apparatus. While it is preferable that the entire mass of refractory, granular particles be treated with boric acid or other suitable free-radical-formation suppressors in accordance with this invention, it is often sufficient to treat the refractory particles disposed in only the top and bottom sections of the reactor which function as the quenching zones, leaving the particles which from the reaction zone untreated.

In order to illustrate this invention, propane was thermally dissociated by flowing the feed stock plus nitrogen through a 200 cc. mass of alumina particles, one-half of which was at reaction temperature and the other half of which was at about room temperature. The alumina particles were ⅛" diameter spheres and were disposed within a 30 mm. diameter quartz tube, the first half of which was contained in, and heated to reaction temperature by, an electric combustion furnace. This heated section was employed as the reaction section. The other half of the mass of particles, contained in the unheated portion of the quartz tube, was at room temperature and served as the quenching zone. The feed-stock gas was contained in an inflated rubber bag attached to the hot end of the quartz tube through a quick-acting valve, and product was accumulated in an evacuated receiver connected to the cool end of the reactor through a second quick-acting valve.

In conducting the experiments, the furnace and reaction sections were heated to the desired temperature, the charge bag was inflated with the feed gas, and the product receiver was evacuated, after which both valves were opened simultaneously and charge allowed to pass through the reaction and quench zones for 0.1 minute, at which time the valves were again closed. Product gases were subsequently quantitatively and qualitatively analyzed. The results obtained by several experiments, which illustrate the effectiveness of the present invention for suppressing side reactions, are summarized in Table I. In those runs in which boron-oxide-coated alumina pebbles were employed, the pebbles were prepared by immersing a mass of pebbles in a concentrated aqueous solution of boric acid (10% by weight) for 10 minutes. The wetted pebbles were dried at about 200°–250° F. for 8 hours, and thereafter calcined in a muffle furnace at 500° F. for 1 hour.

*Table I*

|  | Run | | |
|---|---|---|---|
|  | A | B | C |
| Charge | Propane | Propane | Propane |
| Type of bed | (1) | (1) | (2) |
| Initial temperature (° F.) | 1,400 | 1,500 | 1,500 |
| Gas hourly space velocity (approx.) | 6,000 | 6,670 | 5,000 |
| Conversion, Mol. percent | 94.7 | 99.7 | 78.9 |
| Ultimate yield, Mol. percent:[3] | | | |
| Hydrogen | 45.0 | 61.6 | 42.6 |
| Methane | 69.2 | 79.2 | 62.3 |
| Acetylene | 1.4 | 8.0 | 1.2 |
| Ethylene | 71.0 } 82.3 | 63.6 } 66.3 | 64.4 } 86.4 |
| Propylene | 11.3 | 2.7 | 22.0 |
| Benzene | 1.6 | 2.7 | 1.2 |

[1] Norton heat-exchange pebbles (⅛" dia. spheres of fused alumina).
[2] Norton heat-exchange pebbles impregnated with boron oxide.
[3] The yield of a given product in the reactor effluent expressed as a percentage of the limiting reactant in the reactor feed which is converted and disappears during the course of reaction.

In Run A, which was conducted with untreated heat-exchange pebbles at an initial temperature of 1400° F., conversion was 94.7 mol. percent and ultimate yield of the desired propylene and ethylene was 82.3%. When the initial temperature was raised to 1500° F. in run B, again with untreated pellets and propane charge, conversion was increased to 99.7 mol. percent, but the ultimate yield of propylene and ethylene was very seriously affected, dropping to 66.3%. To demonstrate the effectiveness of this invention, the heat-exchange pellets contained in the reaction and quench zones during run C were first treated with boric acid (converted to boron oxide, $B_2O_3$) as hereinbefore described, and a run was conducted at 1500° F. initial temperature, again with propane as charge. While conversion was reduced from the 99.7% mol. of run B to 78.9%, the ultimate recovery was remarkably improved from 66.3% to 86.4%, which was even higher than had been achieved with the untreated pellets at 1400° F. in run A. Thus, it can be seen that our pellet treatment permits operation at higher temperatures to attain the same ultimate yield of desired products, thereby permitting longer periods of onstream operation before shut-down for reheating. Alternatively, even higher temperatures than illustrated can be used to increase conversion while still obtaining ultimate yields similar to those obtained with untreated pebbles at lower temperatures.

It will be noted from the foregoing non-limiting, illustrative example that boron oxide was employed as the free radical suppressor. Other compounds of boron which will yield boric anhydride ($B_2O_3$) under conditions of treatment or use can be employed, e.g., borate esters. Similarly, beryllium oxide (BeO), or compounds which yield BeO under conditions of treatment or use, can be used to coat the granules, pellets, or pebbles.

In employing the instant invention, various types of refractory masses can be treated with compounds yielding boric oxide, or other similar side-reaction suppressors. Accordingly, the refractory mass may take the form of granular particles having a nominal diameter of about 1/16" to 2". Any refractory material which is resistant to degradation at the high temperatures encountered in the reaction zone can be employed, including but not limited to alumina, Carborundum, Stellite, magnesia, chromia, zirconia, mullite, silica, etc. The particles which are employed are substantially non-porous, having a porosity of less than about 10%. Granular particles of this nature can be employed in either fixed-bed processes, such as discussed above, the apparatus employed by Royster in U.S. Patent 2,470,578 and others, or moving-bed systems such as the Thermofor pyrolytic cracking unit. In this latter apparatus, a moving mass of a refractory in bead or pellet form is circulated continuously through a pyrolysis section. Another type of fixed-bed, regenerative, refractory system in which the instant invention can be employed is the so-called Koppers-Hasche process in which a long hollow core of a suitable refractory, such as alumina, approximately square in cross-section, is employed. Operational details of pyrolytic systems of this nature are described in Industrial & Engeering Chemistry, 47 (8), 1517 et seq., August 1955. When treating the tubular cores employed in this process in accordance with the instant invention, the interior surfaces of the specially designed refractory mass are coated with boric oxide or other similar suppressing agents.

The suppressor can be incorporated in or on the refractory mass in any convenient manner. For example, the granular refractory employed in carrying out the above experiments was treated with boric acid by soaking 100 cc. of ⅛" diameter granular particles in a 10 weight percent aqueous solution of hot boric acid. After the particles had remained in the solution for about 10 minutes, the impregnating boric acid solution was drained off and the impregnated pellets were decomposed and dried in a muffle furnace at a temperature of 500° F. for about 60 minutes before use in the process. Other methods for treating the refractory particles with the suppressing agents include the use of vacuum in effecting the impregnation or coating. The heat-transfer particles can be either dipped, immersed, sprayed or otherwise treated to be coated with the boric acid or other side-reaction suppressor employed.

Another expedient for coating the surfaces of the heat-transfer material used is to incorporate the side-reaction suppressor in the formulation utilized in the manufacture of the heat-transfer mass. The side-reaction suppressor can be in the oxide form or can be provided as a boron or beryllium composition which upon being exposed to the high temperatures encountered in the calcining of the refractory mass, is converted to the oxide form. The amount of side-reaction suppressor which is incorporated in the refractory mass depends upon the porosity of the refractory material employed. In general, an amount sufficient to insure substantially complete coverage of the surface is required.

Although the illustrative example is directed to the production of ethylene and propylene, the instant invention also finds application in the production of acetylene from natural gas; acetylene and/or ethylene from propane; ethylene from ethane; and ethylene from ethane-propane mixtures, and other $C_2$–$C_6$ hydrocarbons, or mixtures thereof.

As in conventional, prior art, regenerative refractory systems, operating conditions will depend upon the nature of the feed stock being processed and the desired end product. In processes of this type, short contact times of 0.001 to 1.0 second are employed. In general, temperatures from about 1500 to 3000° F. will be employed using a feed rate of 10 to 50 cu. ft. per second (STP) per square foot of cross-section when employing granular particles, or 100 to 300 cu. ft. per minute per square foot of cross-section when employing tubular refractories such as utilized in the Koppers-Hasche process.

It is evident that modifications of the illustrative examples within the scope of this invention can be made by those skilled in the art. Accordingly, any variations of this nature are covered by this invention, which is defined in the appended claims.

We claim:

1. In a regenerative, refractory, non-catalytic, pyrolytic, gas conversion process, which comprises momentarily contacting a hydrocarbon feed in a reaction zone with a first mass of refractory heat transfer pebbles heated to a conversion level temperature for a time sufficient to effect the conversion of said reactant to produce a reaction effluent and immediately thereafter rapidly cooling the reaction effluent to a temperature below conversion temperature in a quenching zone by contacting the reaction effluent with a cool, second mass of refractory heat transfer pebbles which is at a temperature substantially below said conversion temperature, the improvement which comprises employing in the cooling of said reaction effluent refractory substantially non-porous pebbles having the surfaces thereof substantially coated with a pellicular layer of boric oxide in an amount sufficient to substantially inhibit any free radical formation or polymerization of said reaction effluent in said quenching zone.

2. In a regenerative, refractory, non-catalytic, pyrolytic, hydrocarbon conversion process which comprises contacting a hydrocarbon feed for about 0.001–0.1 second in a reaction zone comprising a first, aggregate mass of granular, refractory heat-transfer pebbles heated to a reaction temperature of about 1500–3000° F. to produce a reaction effluent, and immediately thereafter rapidly cooling the reaction effluent below reaction temperature in a quenching zone by contacting the reaction effluent with a cool, second aggregate mass of adsorptive, granular refractory, heat-transfer pebbles which is at a temperature substantially below reaction temperature, the improvement which comprises employing in the cooling of said reaction effluent refractory substantially non-porous pebbles having the surfaces thereof substantially coated with a pellicular layer of a side-reaction suppressor consisting of boric oxide in an amount sufficient to substantially inhibit any free radical formation or polymerization of said reaction effluent in said quenching zone.

3. A process in accordance with claim 2 in which the second aggregate mass is prepared by soaking said substantially non-porous pebbles in a solution of boric acid, drying said pebbles and calcining the dried pebbles at a temperature sufficient to convert said boric acid to boric oxide.

4. A process in accordance with claim 3 in which an aggregate mass of fused-alumina pebbles is employed.

5. A granular, heat-transfer particle comprising a small-size substantially non-porous pebble of an absorptive refractory material, the surfaces of said refractory material being coated with a pellicular layer of boric oxide as a side-reaction suppressor.

6. A granular, heat-transfer particle comprising a small-size substantially non-porous pebble of an adsorptive refractory material, the surfaces of said refractory material being coated with a pellicular layer of a side-reaction suppressor, said pebble being prepared by soaking a pebble of an adsorptive, refractory material in a solution of a composition which upon calcination will be converted to boric oxide, drying the soaked pebble, and calcining the dried pebble whereby said composition will be converted to the oxide.

7. A granular, heat-transfer pebble in accordance with claim 6 in which said adsorptive material is fused alumina.

8. A granular, heat-transfer pebble in accordance with claim 6 in which said adsorptive material has a porosity of less than 10%.

9. In a regenerative, refractory, non-catalytic, pyrolytic, gas conversion process which comprises momentarily contacting a hydrocarbon feed and a first refractory mass in a reaction zone heated to a conversion level temperature for a time sufficient to effect the conversion of at least part of said reactant to produce a reaction effluent, and immediately thereafter rapidly cooling the reaction effluent to a temperature below conversion level in a quenching zone by contacting the reaction effluent with a cool, second refractory mass which is at a temperature substantially below said conversion level temperature, the improvement which comprises employing as said first and second refractory masses solid substantially non-porous pebbles having the surfaces thereof substantially coated with a pellicular layer of boric oxide as a side-reaction suppressor, in an amount sufficient to substantially inhibit any free radical formation or polymerization of said reaction effluent in said reaction and quenching zones.

References Cited in the file of this patent

UNITED STATES PATENTS

| | | |
|---|---|---|
| 1,107,011 | Allen | Aug. 11, 1914 |
| 2,186,590 | Martin et al. | Jan. 9, 1940 |
| 2,289,757 | Connolly | July 14, 1942 |
| 2,375,725 | Bailey et al. | May 8, 1945 |
| 2,407,914 | Bailey et al. | Sept. 17, 1946 |
| 2,510,994 | Mills | June 13, 1950 |
| 2,750,181 | Quigg | June 12, 1956 |
| 2,751,333 | Heinemann | June 19, 1956 |
| 2,785,212 | Begley | Mar. 12, 1957 |